Figure 1:
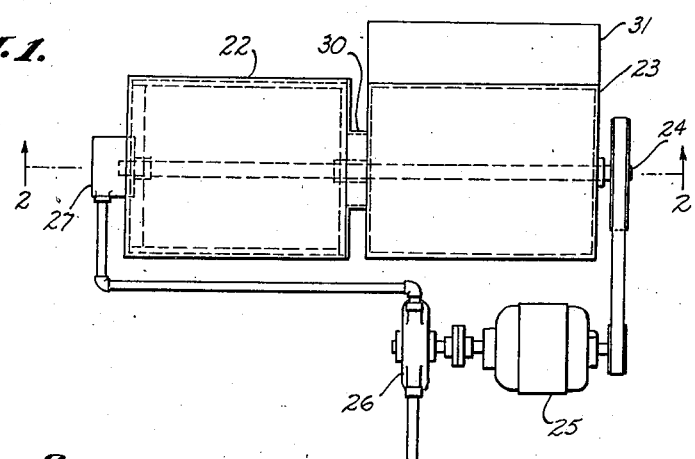

Sept. 2, 1941.   E. D. FELDMAN   2,254,213
AIR-CONDITIONING APPARATUS
Filed Jan. 24, 1939

INVENTOR.
Edward D. Feldman,
BY
ATTORNEY.

Patented Sept. 2, 1941

2,254,213

UNITED STATES PATENT OFFICE 2,254,213

AIR-CONDITIONING APPARATUS

Edward D. Feldman, Glendale, Calif., assignor of one-third to Alan C. Stoneman, Los Angeles, Calif., and one-third to Harry W. Greenberg, Glendale, Calif.

Application January 24, 1939, Serial No. 252,584

1 Claim. (Cl. 261—90)

My invention relates generally to air-conditioning, and in particular to apparatus for reducing both the temperature and the dew-point of the effluent air below that of the influent air.

It is an object of my invention to provide a means of reducing the dew-point of air without the use of refrigeration equipment, and without the use of absorbing means, such as hygroscopic pads, which must be frequently replaced or reactivated.

It is another object of my invention to provide a means of reducing the dew-point of air while at the same time and in the same operation reducing its temperature.

It is also an object of my invention to accomplish these results without the use of expensive or complicated machinery, but with simple, inexpensive devices that are economical to operate.

Figure 2:
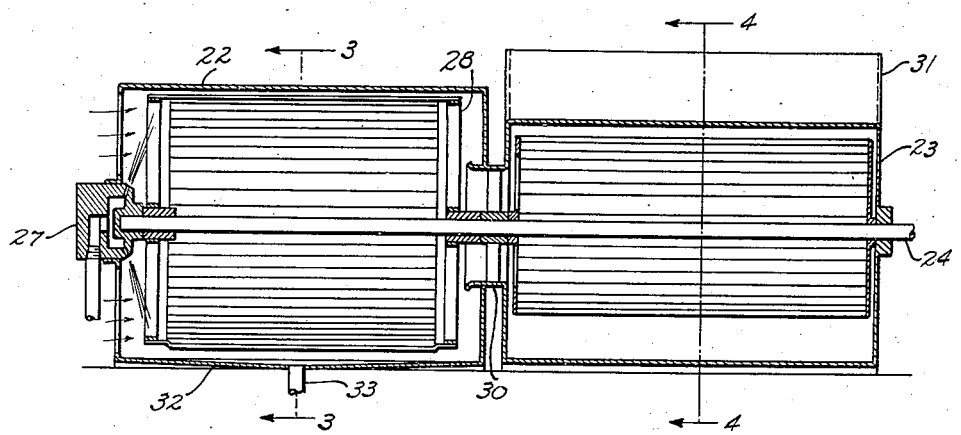
Figure 3:
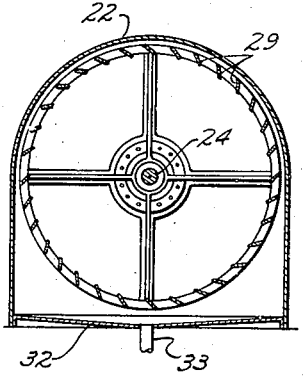
Figure 4:
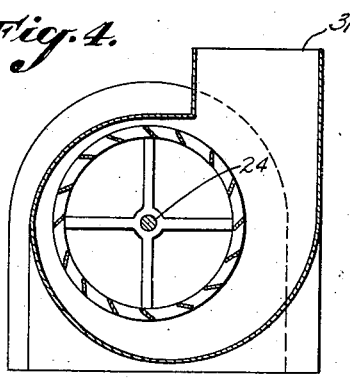

These and other objects of my invention will be apparent from the following description of a preferred and an optional form thereof, and from the drawing illustrating those forms, in which:

Fig. 1 is a top view of the preferred form of my invention, showing the dehumidifier and cooler, the blower, and the driving motor, Fig. 2 is sectional elevation taken at 2—2 in Fig. 1, Fig. 3 is a cross-sectional elevation of the dehumidifier and cooler taken at 3—3 in Fig. 2, Fig. 4 is a cross-sectional elevation of the blower taken at 4—4 in Fig. 2.

In Fig. 1, the numeral 22 indicates a housing enclosing the dehumidifier and cooler and adjacent to it is a blower housing 23. The two housings are disposed co-axially and have a common shaft 24 which is driven by a motor 25 which also drives a pump 26 that furnishes water under pressure for spray 27. The housing 22 is of a generally cylindrical shape, and the air enters through one end, passes through the cylinder, into the blower 23, and out through a duct 31. The spray nozzle 27 is preferably mounted on the axis of the dehumidifier at the end through which the air enters, and is designed to produce a spray of water drops of a relatively large size and traveling at a comparatively high rate of speed in a direction substantially perpendicular to the flow of air into the dehumidifier and covering the entire entrance to it. If desired, instead of having the single spray 27, a portion of the shaft 24 may be hollowed and provided with a series of jets arranged along its length, so that the stream of air through the dehumidifier passes through a plurality of sprays before reaching the blower.

Within the housing 22, I provide a hollow rotating cylinder 28 mounted on the shaft 24 and provided with a series of louvers 29 around its periphery. The ends of the cylinder 28 are cut away as shown in Fig. 3, so as not to obstruct the flow of air and to create as little turbulence as possible. A duct 30, co-axial with the shaft 24, permits the central section of the column of air in the housing 22 to pass into the blower housing 23, and on out through the duct 31. The blower may be any one of various types well-known in the art, and needs no detailed description here.

In the operation of this form of my invention, air enters the housing 22 and passes through the spray where it is washed, cooled, and dehumidified as previously explained. Passing further into the cylinder 28, the air is given a helical motion by means of the louvers 29. The water particles present in the air, by reason of the motion given to them by the spray 27 and by reason of the centrifugal force supplied them by the column of air, are thrown toward the outside where they impinge upon the walls of the housing 28, and drop to the bottom 32 where they are drained away through a drain-pipe 33. The reason for the dehumidification of the air is not thoroughly understood, but I believe it to be due to the fairly large drops of water traveling through the air at a comparatively high rate of speed attracting or entraining the molecules of water vapor present in the influent air, and carrying them along with the drops of water to the wall of the housing. The louvers 29 assist in throwing out the drops of water, and as a further aid to the supplying of comparatively dry air to the blower 23, the passageway 30 is designed so that only the central portion of the column of air, which is the driest, is discharged through it into the blower. In my preferred form, approximately 85% of the air entering the dehumidifier goes into the blower directly, and about 15% is thrown out through the louvers. To secure greater efficiency, this 15% thrown out through the louvers may be passed into the dehumidifier again, since it has been cooled and will help to cool the other influent air.

While this method works very satisfactorily with water at the temperature of the dew-point of the influent air, if desired, even greater dehumidification may be obtained by the use of water chilled a substantial amount below the dew-point of the air. In this way, by taking advantage of the evaporative cooling of the water, a large amount of heat and moisture may be removed from the air by the use of a much smaller refrigerating plant than has heretofore been possible.

By experiment, it has been found that the water drops should leave the orifice at an angle not greater than 30° from the perpendicular to the flow of air, and where the words "substantially" or "approximately perpendicular" or their equivalents appear in this description or in the appended claim, they are to be interpreted as including such a substantial angle.

While I have shown and described a preferred and an optional form of my invention, it will be apparent that modifications may be made which in no way depart from the basic ideas as herein described.

I claim as my invention:

An air-conditioning apparatus which includes: an air conduit; a louvred cylinder rotatably mounted within said conduit and forming an annular passage therewith; means within said cylinder for producing a high velocity spray of water therein at a substantial angle to the longitudinal axis thereof; means for inducing a flow of air through said cylinder; means for rotating said cylinder whereby said air is given a helical motion; and means for discharging only the relatively dry core of said air stream and causing the outer portion thereof to pass back through said annular passage to again pass through said spray.

EDWARD D. FELDMAN.